(12) United States Patent
Hong

(10) Patent No.: US 11,460,839 B2
(45) Date of Patent: Oct. 4, 2022

(54) UNMANNED AERIAL VEHICLE ACCESS METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 489 days.

(21) Appl. No.: 16/634,146

(22) PCT Filed: Aug. 10, 2017

(86) PCT No.: PCT/CN2017/096818
§ 371 (c)(1),
(2) Date: Jan. 25, 2020

(87) PCT Pub. No.: WO2019/028738
PCT Pub. Date: Feb. 14, 2019

(65) Prior Publication Data
US 2020/0174468 A1 Jun. 4, 2020

(51) Int. Cl.
*G05D 1/00* (2006.01)
*B64C 39/02* (2006.01)
*G08G 5/00* (2006.01)

(52) U.S. Cl.
CPC ......... *G05D 1/0022* (2013.01); *B64C 39/024* (2013.01); *G08G 5/0013* (2013.01)

(58) Field of Classification Search
CPC .. G05D 1/0022; B64C 39/024; G08G 5/0013; H04W 74/00
See application file for complete search history.

(56) References Cited

U.S. PATENT DOCUMENTS 8,102,804 B2   1/2012  Noh
8,611,297 B2  12/2013  Noh
(Continued)

FOREIGN PATENT DOCUMENTS

CN     101155405 A    4/2008
CN     101222756 A    7/2008
(Continued)

OTHER PUBLICATIONS

Huawei etal, "Potential enhancements for drones", 3GPP TSG RAN WG1 Meeting #89: R1-1707016, Hangzhou, China, May 15-19, 2017.
(Continued)

*Primary Examiner* — Elaine Gort
*Assistant Examiner* — Anthony M Gartrelle
(74) *Attorney, Agent, or Firm* — Syncoda LLC; Feng Ma

(57) ABSTRACT

An unmanned aerial vehicle access method being used for a base station includes: receiving a random access request sent by an unmanned aerial vehicle, the random access request including a random access preamble; when it is determined to respond to the random access request of the unmanned aerial vehicle, sending a random access initial response to the unmanned aerial vehicle; receiving a first message sent by the unmanned aerial vehicle, the first message including terminal indication information, the terminal indication information being used for indicating that a terminal, which requests to access, is the unmanned aerial vehicle; and when it is determined to allow the access of the unmanned aerial vehicle, sending, to the unmanned aerial vehicle, a second message for indicating that access is allowed.

20 Claims, 12 Drawing Sheets

(56) References Cited

U.S. PATENT DOCUMENTS

| | | | |
|---|---|---|---|
| 9,179,374 B2 | 11/2015 | Xiao et al. | |
| 9,288,824 B2 | 3/2016 | Noh et al. | |
| 9,750,054 B2 | 8/2017 | Noh et al. | |
| 2009/0175292 A1 | 7/2009 | Noh | |
| 2009/0191875 A1* | 7/2009 | Vujcic | H04W 74/004 455/436 |
| 2012/0093173 A1 | 4/2012 | Noh | |
| 2013/0322381 A1 | 12/2013 | Noh et al. | |
| 2014/0194124 A1 | 7/2014 | Xiao et al. | |
| 2016/0198495 A1 | 7/2016 | Noh et al. | |
| 2016/0330771 A1* | 11/2016 | Tan | H04W 72/08 |
| 2017/0118688 A1 | 4/2017 | Guvenc | |
| 2017/0359842 A1 | 12/2017 | Noh et al. | |
| 2018/0097560 A1* | 4/2018 | Jalali | H01Q 1/28 |
| 2019/0077508 A1* | 3/2019 | Shimezawa | G05D 1/0011 |
| 2019/0239123 A1* | 8/2019 | Kim | H04L 5/0044 |
| 2021/0103294 A1* | 4/2021 | Mahkonen | G08G 5/006 |
| 2021/0209691 A1* | 7/2021 | Salazar Ibanez | H04W 4/021 |
| 2021/0274311 A1* | 9/2021 | Mahkonen | B64C 39/024 |

FOREIGN PATENT DOCUMENTS

| | | | |
|---|---|---|---|
| CN | 102014516 A | 4/2011 | |
| CN | 102123477 A | 7/2011 | |
| CN | 103002526 A | 3/2013 | |
| CN | 103997794 A | 8/2014 | |
| CN | 106162840 A | 11/2016 | |
| CN | 106341899 A | 1/2017 | |
| CN | 106576286 A | 4/2017 | |
| CN | 106792497 A | 5/2017 | |
| CN | 106792998 A | 5/2017 | |
| EP | 3187007 A1 | 7/2017 | |
| WO | 2016149098 A1 | 9/2016 | |
| WO | WO 2019/005608 A1 * | 1/2019 | H04W 74/00 |

OTHER PUBLICATIONS

First Office Action of the Chinese application No. 201780000840.X, dated Apr. 8, 2021.

Second Office Action of the Chinese application No. 201780000840.X, dated Aug. 27, 2021.

International Search Report in the international application No. PCT/CN2017/096818, dated May 11, 2018.

English translation of the Written Opinion of the International Search Authority in the international application No. PCT/CN2017/096818, dated May 22, 2018.

* cited by examiner

UNMANNED AERIAL VEHICLE ACCESS METHOD AND DEVICE

CROSS-REFERENCE TO RELATED APPLICATION

The present application is a national stage of International Application No. PCT/CN2017/096818 filed on Aug. 10, 2017, the disclosure of which is hereby incorporated by reference in its entirety.

TECHNICAL FIELD

The present disclosure relates to the field of communications, and more particularly, to an Unmanned Aerial Vehicle (UAV) access method and device.

BACKGROUND

An unmanned aerial vehicle (known as UAV for short) is a pilotless aircraft operated by means of a radio remote control device and its own program control apparatus.

With the continuous development of a UAV technology, the UAV has also been widely used. In the related art, in order to further expand an application range of the UAV, a cellular network needs to provide the UAV with a service to meet demands. However, after the UAV is flying, since the height is higher than that of an ordinary terminal and there is little occlusion, it can cause great interference to terminals of neighboring cells.

SUMMARY

To overcome the problems in the related art, embodiments of the present disclosure provide a UAV access method and device.

According to a first aspect of embodiments of the present disclosure, a UAV access method is provided. The method is applied to a base station and includes the following steps.

A random access request sent by a UAV is received, and the random access request includes a Random Access Preamble (RAP).

When it is determined to respond to the random access request of the UAV, a random access initial response is sent to the UAV.

A first message sent by the UAV is received, the first message includes terminal indication information, and the terminal indication information is configured to indicate that a terminal, which requests access, is the UAV.

When it is determined to allow access of the UAV, a second message for indicating that the access is allowed is sent to the UAV.

Optionally, the random access initial response may include the RAP.

Optionally, the terminal indication information may include at least one of: a UAV type identifier, a UAV identification number, or a UAV device number.

Optionally, the second message may include the terminal indication information.

Optionally, the method may further include the following steps.

It is judged whether a degree of interference of a current cell to a neighboring cell is less than a set threshold.

When the degree of interference is less than the set threshold, it is determined to allow the access of the UAV.

When the degree of interference is greater than or equal to the set threshold, it is determined that the access of the UAV is not allowed.

Optionally, the method may further include the following steps.

When it is determined that the access of the UAV is not allowed, a third message for indicating that the access is not allowed is sent to the UAV.

According to a second aspect of embodiments of the present disclosure, a UAV access method is provided. The method is applied to a UAV and includes the following steps.

A random access request is sent to a base station, and the random access request includes an RAP.

A random access initial response sent by the base station is received.

It is determined that the base station responds to the random access request according to the random access initial response.

A first message is sent to the base station, the first message includes terminal indication information, and the terminal indication information is configured to indicate that a terminal, which requests access, is the UAV.

A second message which is sent by the base station for indicating that access is allowed is received.

It is determined that the base station allows the access of the UAV according to the second message.

It accesses to the base station.

Optionally, the random access initial response may include the RAP. The operation that it is determined that the base station responds to the random access request according to the random access initial response may include the following operation.

It is determined that the base station responds to the random access request according to the random access initial response including the RAP.

Optionally, the terminal indication information may include at least one of: a UAV type identifier, a UAV identification number, or a UAV device number.

Optionally, the second message may include the terminal indication information. The operation that it is determined that the base station allows the access of the UAV according to the second message may include the following operation.

It is determined that the base station allows the access of the UAV according to the second message including the terminal indication information.

Optionally, the method may further include the following steps.

A third message which is sent by the base station for indicating that the access is not allowed is received.

It is determined that the base station does not allow the access of the UAV according to the third message.

According to a third aspect of embodiments of the present disclosure, a UAV access device is provided. The device is applied to a base station and includes:

a first receiving module, configured to receive a random access request sent by a UAV, and the random access request includes an RAP;

a first sending module, configured to send a random access initial response to the UAV when it is determined to respond to the random access request of the UAV;

a second receiving module, configured to receive a first message sent by the UAV, the first message includes terminal indication information, and the terminal indication information is configured to indicate that a terminal, which requests access, is the UAV; and a second sending module, configured to send a second message for indicating that access is allowed to the UAV when it is determined to allow the access of the UAV.

Optionally, the random access initial response may include the RAP.

Optionally, the terminal indication information may include at least one of: a UAV type identifier, a UAV identification number, or a UAV device number.

Optionally, the second message may include the terminal indication information.

Optionally, the device may further include:

a judgment module, configured to judge whether a degree of interference of a current cell to a neighboring cell is less than a set threshold;

a first determination module, configured to determine to allow the access of the UAV when the degree of interference is less than the set threshold; and a second determination module, configured to determine that the access of the UAV is not allowed when the degree of interference is greater than or equal to the set threshold.

Optionally, the device may further include:

a third sending module, configured to send a third message for indicating that the access is not allowed to the UAV when it is determined that the access of the UAV is not allowed.

According to a fourth aspect of embodiments of the present disclosure, a UAV access device is provided. The device is applied to a UAV and includes:

a first sending module, configured to send a random access request to a base station, and the random access request includes an RAP;

a first receiving module, configured to receive a random access initial response sent by the base station;

a first determination module, configured to determine that the base station responds to the random access request according to the random access initial response;

a second sending module, configured to send a first message to the base station, the first message includes terminal indication information, and the terminal indication information is configured to indicate that a terminal, which requests access, is the UAV;

a second receiving module, configured to receive a second message which is sent by the base station for indicating that access is allowed;

a second determination module, configured to determine that the base station allows the access of the UAV according to the second message; and an access module, configured to access to the base station.

Optionally, the random access initial response may include the RAP. The first determination module may include:

a first determination sub-module, configured to determine that the base station responds to the random access request according to the random access initial response including the RAP.

Optionally, the terminal indication information may include at least one of: a UAV type identifier, a UAV identification number, or a UAV device number.

Optionally, the second message may include the terminal indication information. The second determination module may include:

a second determination sub-module, configured to determine that the base station allows the access of the UAV according to the second message including the terminal indication information.

Optionally, the device may further include:

a third receiving module, configured to receive a third message which is sent by the base station for indicating that the access is not allowed; and a third determination module, configured to determine that the base station does not allow the access of the UAV according to the third message.

According to a fifth aspect of embodiments of the present disclosure, a non-transitory computer-readable storage medium having a computer program stored thereon is provided. The computer program is configured to execute the UAV access method in the first aspect.

According to a sixth aspect of embodiments of the present disclosure, a non-transitory computer-readable storage medium having a computer program stored thereon is provided. The computer program is configured to execute the UAV access method in the second aspect.

According to a seventh aspect of embodiments of the present disclosure, a UAV access device is provided. The device is applied to a base station, and includes:

a processor; and a memory configured to store an instruction executable for the processor.

The processor is configured to:

receive a random access request sent by a UAV, and the random access request includes an RAP;

send a random access initial response to the UAV when it is determined to respond to the random access request of the UAV;

receive a first message sent by the UAV, the first message includes terminal indication information, and the terminal indication information is configured to indicate that a terminal, which requests access, is the UAV; and send a second message for indicating that access is allowed to the UAV when it is determined to allow the access of the UAV.

According to an eighth aspect of embodiments of the present disclosure, a UAV access device is provided. The device is applied to a UAV, and includes:

a processor; and a memory configured to store an instruction executable for the processor.

The processor is configured to:

send a random access request to a base station, and the random access request includes an RAP;

receive a random access initial response sent by the base station;

determine that the base station responds to the random access request according to the random access initial response;

send a first message to the base station, the first message includes terminal indication information, and the terminal indication information is configured to indicate that a terminal, which requests access, is the UAV;

receive a second message which is sent by the base station for indicating that access is allowed;

determine that the base station allows the access of the UAV according to the second message; and access to the base station.

The technical solutions provided by the embodiments of the present disclosure can include the following beneficial effects:

In the embodiments of the present disclosure, the base station receives a random access request sent by the UAV, and the random access request includes an RAP. When it is determined to respond to the random access request of the UAV, the base station sends a random access initial response to the UAV, and receives a first message sent by the UAV. The first message includes terminal indication information, and the terminal indication information is configured to indicate that a terminal, which requests access, is the UAV. When it is determined to allow the access of the UAV, the base station sends the UAV a second message for indicating that access is allowed, so that control of access of a UAV to be started in a random access phase is enabled, thereby avoiding interference possibly generated by the UAV.

In the embodiments of the present disclosure, the base station can further send a random access initial response including the RAP of the UAV to the UAV, so that the UAV receives the random access initial response consistent with the RAP sent by the UAV, it can be quickly determined that the base station responds to the random access request of the UAV, and the access efficiency and reliability of the UAV are improved.

In the embodiments of the present disclosure, the terminal indication information received by the base station can include at least one of: a UAV type identifier, a UAV identification number, or a UAV device number. The UAV type identifier, the UAV identification number and the UAV device number can be configured to indicate that the terminal, which requests access, is the UAV, so that the indication manner of the UAV is enriched, and the access efficiency of the UAV is improved.

In the embodiments of the present disclosure, the base station can further send a second message for indicating that the access is allowed to the UAV, and the second message includes the terminal indication information, so that the UAV receives the second message consistent with the terminal indication information sent by the UAV, it can be quickly determined that the base station allows the access of the UAV, and the access efficiency and reliability of the UAV are improved.

In the embodiments of the present disclosure, the base station can further judge whether a degree of interference of a current cell to a neighboring cell is less than a set threshold, if yes, the base station determines to allow the access of the UAV, otherwise, the base station determines that the access of the UAV is not allowed, so that it is determined whether to allow the access of the UAV according to the degree of interference of the current cell to the neighboring cell, thereby avoiding that the current cell can cause great interference to the neighboring cell.

In the embodiments of the present disclosure, the base station can send a second message for indicating that the access is allowed to the UAV. When it is determined that the access of the UAV is not allowed, the base station can send a third message for indicating that the access is not allowed to the UAV, so that control of access of a UAV to be started in a random access phase is enabled, thereby avoiding interference possibly generated by the UAV.

In the embodiments of the present disclosure, the UAV sends a random access request to the base station, and the random access request includes an RAP. The UAV receives a random access initial response sent by the base station, determines that the base station responds to the random access request according to the random access initial response, and sends a first message to the base station. The first message includes terminal indication information, and the terminal indication information is configured to indicate that a terminal, which requests access, is the UAV. The UAV receives a second message which is sent by the base station for indicating that access is allowed, determines that the base station allows the access of the UAV according to the second message, and accesses to the base station. Thus, the base station learns that the terminal, which requests access, is the UAV according to the terminal indication information, and determines whether to allow the access of the UAV according to specific situations, so that control of access of a UAV to be started in a random access phase is enabled, thereby avoiding interference possibly generated by the UAV.

In the embodiments of the present disclosure, the UAV can further receive a random access initial response which is sent by the base station and includes the RAP of the UAV, so that the UAV can quickly determine that the base station responds to the random access request of the UAV according to the RAP, and the access efficiency and reliability of the UAV are improved.

In the embodiments of the present disclosure, the terminal indication information sent to the base station by the UAV can include at least one of: a UAV type identifier, a UAV identification number, or a UAV device number. The UAV type identifier, the UAV identification number and the UAV device number can be configured to indicate that the terminal, which requests access, is the UAV, so that the indication manner of the UAV is enriched, and the access efficiency of the UAV is improved.

In the embodiments of the present disclosure, the UAV can further receive a second message which is sent by the base station for indicating that access is allowed, and the second message includes the terminal indication information, so that the UAV can quickly determine that the base station allows the access of the UAV according to the terminal indication information, and the access efficiency and reliability of the UAV are improved.

In the embodiments of the present disclosure, the UAV can further receive a third message which is sent by the base station for indicating that the access is not allowed, and determine that the base station does not allow the access of the UAV according to the third message, so that control of access of a UAV to be started in a random access phase is enabled, thereby avoiding interference possibly generated by the UAV.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this disclosure, illustrate embodiments consistent with the present invention and, together with the description, serve to explain the principles of the present invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present invention. Instead, they are merely examples of apparatuses and methods consistent with aspects related to the present invention as recited in the appended claims.

The terminology used in the present disclosure is for the purpose of describing particular embodiments only, and is not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It should be understood that, although terms first, second, third and the like can be adopted to describe various information in the present disclosure, the information should not be limited to these terms. These terms are only adopted to distinguish the information of the same type. For example, indication information can also be called second information without departing from the scope of the present disclosure. Similarly, the second information can also be called indication information. For example, term "if" used here can be explained as "while" or "when" or "responsive to determining/in response to determining," which depends on the context.

Figure 1:
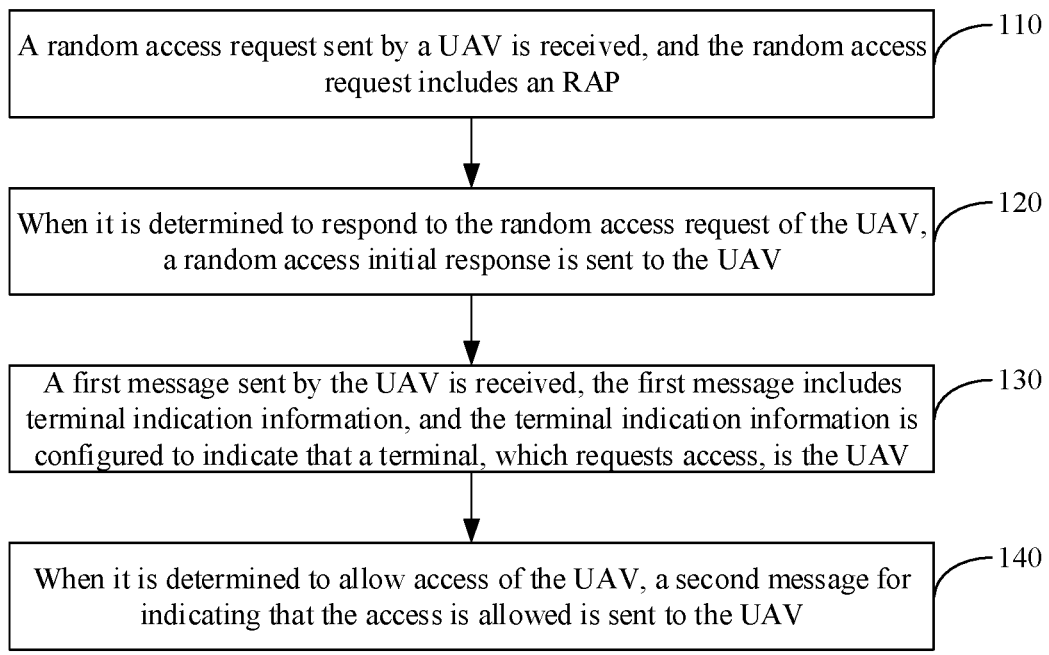
FIG. 1 is a flowchart of a UAV access method according to an exemplary embodiment.
Figure 2:
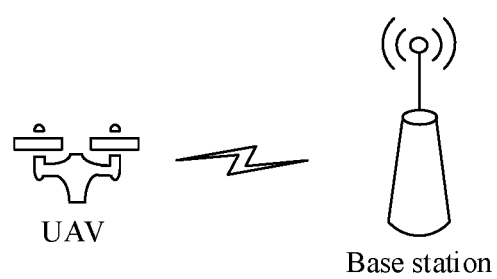
FIG. 2 is a scene diagram of a UAV access method according to an exemplary embodiment.

FIG. 1 is a flowchart of a UAV access method according to an exemplary embodiment. FIG. 2 is a scene diagram of a UAV access method according to an exemplary embodiment. The UAV access method can be applied to a base station, and the base station is a base station to which a UAV requests access. As illustrated in FIG. 1, the UAV access method includes the following steps 110-140.

At S110, a random access request sent by/from a UAV is received, and the random access request includes an RAP.

In embodiments of the present disclosure, the UAV is a cellular network UAV, that is, the UAV can accept a service provided by the cellular network.

In embodiments of the present disclosure, a random access is a necessary process for establishing a wireless/radio link between the UAV and the cellular network, and a data interoperation between the base station and the UAV can be performed normally only after the random access is completed. When the UAV requests access to the base station, the UAV selects a preamble, adds the preamble to a random access request, and sends the random access request to the base station.

In embodiments of the present disclosure, the random access can be a contention-based random access, and the random access request can be an RAP in a contention-based random access process.

At S120, when it is determined to respond to the random access request of the UAV, a random access initial response is sent to the UAV.

In embodiments of the present disclosure, when receiving the random access request of/from the UAV, the base station can also receive a random access request of another terminal. When it is determined to respond to the random access request of the UAV, the base station can return a random access initial response to the UAV, so that the UAV can know that the base station has made an initial response to the random access request according to the random access initial response.

In embodiments of the present disclosure, the random access initial response can be a Random Access Response (RAR) in a contention-based random access process.

At S130, a first message sent by the UAV is received, the first message includes terminal indication information, and the terminal indication information is configured to indicate that a terminal, which requests access, is the UAV.

In embodiments of the present disclosure, the first message can be message 3 in the contention-based random access process.

At S140, when it is determined to allow access of the UAV, a second message for indicating that the access is allowed is sent to the UAV.

In embodiments of the present disclosure, the base station learns/knows that the terminal which requests access is the UAV, and determines whether to allow access of the UAV according to a specific situation. If the access is allowed, a second message for indicating that the access is allowed is sent to the UAV. If the access is not allowed, a third message for indicating that the access is not allowed is sent to the UAV.

In embodiments of the present disclosure, the second or third message can implement an indication function by means of contention resolution signaling in the contention-based random access process.

In an exemplary scene, as illustrated in FIG. 2, a UAV and a base station are included. When the UAV requests access to the base station, a preamble is selected at first and is added into a random access request, and the random access request is sent to the base station. The base station receives the random access request of the UAV, and sends a random access initial response to the UAV when it is determined to respond to the random access request of the UAV. After receiving the random access initial response, the UAV determines that the base station responds to the random access request of the UAV, and sends a first message including terminal indication information to the base station. The terminal indication information is configured to indicate that the terminal which requests access is the UAV. After receiving the first message and learning that the terminal which requests access is the UAV according to the terminal indication information in the first message, the base station judges whether to allow the access of the UAV according to a degree of interference of a current network. When it is determined to allow the access of the UAV, a second message for indicating that the access is allowed is sent to the UAV. After receiving the second message for indicating that the access is allowed, the UAV determines that the base station allows the access of the UAV according to the second message, and accesses to the base station.

It can be seen from the above embodiments that a random access request sent by a UAV is received, and the random access request includes an RAP. When it is determined to respond to the random access request of the UAV, a random access initial response is sent to the UAV. A first message sent by the UAV is received, the first message includes terminal indication information, and the terminal indication information is configured to indicate that a terminal, which requests access, is the UAV. When it is determined to allow the access of the UAV, a second message for indicating that the access is allowed is sent to the UAV, so that control of access of the UAV to be started in a random access phase is enabled, thereby avoiding interference possibly generated by the UAV.

In an embodiment, the random access initial response at S120 can include the RAP of the UAV.

In embodiments of the present disclosure, when determining to respond to the random access request of the UAV, the base station can add a random preamble included in the random access request into a random access initial response, and send the random access initial response added with the random preamble to the UAV, so that the UAV determines that the base station responds to the random access request of the UAV according to the random access initial response including the random preamble.

It can be seen from the above embodiments that a random access initial response including the RAP of the UAV is sent to the UAV, so that the UAV receives the random access initial response consistent with the RAP sent by the UAV, it can be quickly determined that the base station responds to the random access request of the UAV, and the access efficiency and reliability of the UAV are improved.

In an embodiment, the terminal indication information at S130 can include at least one of: a UAV type identifier, a UAV identification number, or a UAV device number.

In embodiments of the present disclosure, the function of the terminal indication information is to inform the base station that the terminal which requests access is the UAV, and any one or more of the UAV type identifier, the UAV identification number or the UAV device number can be used to indicate that the terminal which requests access is the UAV.

It can be seen from the above embodiments that the terminal indication information can include at least one of: the UAV type identifier, the UAV identification number, or the UAV device number. The UAV type identifier, the UAV identification number and the UAV device number can be configured to indicate that the terminal, which requests access, is the UAV, so that the indication manner of the UAV is enriched, and the access efficiency of the UAV is improved.

In an embodiment, the second message at S140 includes the terminal indication information.

In embodiments of the present disclosure, when determining to allow the access of the UAV, the base station can add the terminal indication information included in the first message into the second message, and then send the second message added with the terminal indication information to the UAV, so that the UAV determines that the base station allows the access of the UAV according to the second message including the terminal indication information.

It can be seen from the above embodiments that a second message for indicating that the access is allowed is sent to the UAV, and the second message includes the terminal indication information, so that the UAV receives the second message consistent with the terminal indication information sent by the UAV, it can be quickly determined that the base station allows the access of the UAV, and the access efficiency and reliability of the UAV are improved.

Figure 3:
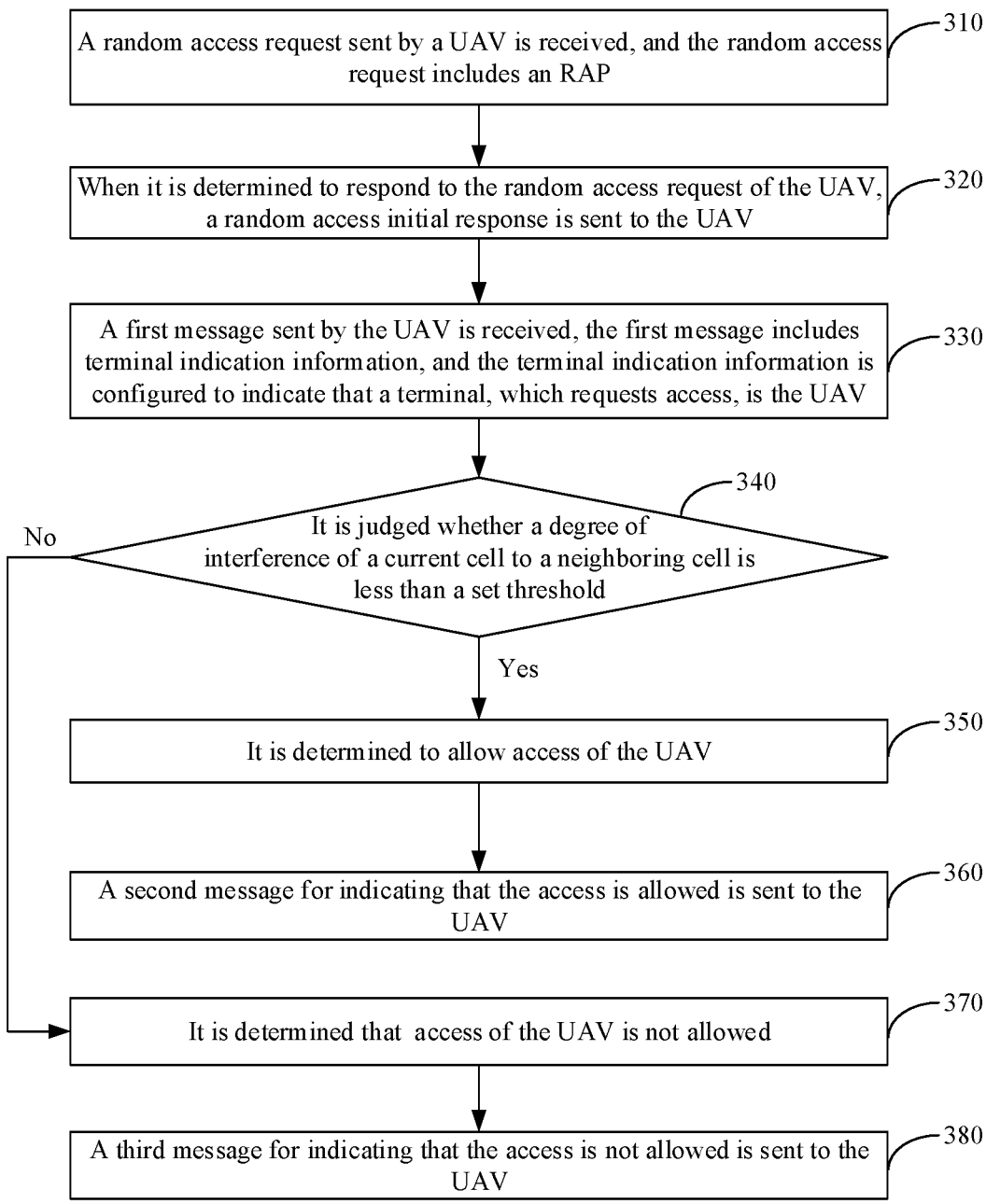
FIG. 3 is a flowchart of another UAV access method according to an exemplary embodiment.

FIG. 3 is a flowchart of another UAV access method according to an exemplary embodiment. The UAV access method can be applied to a base station, and the base station is a base station to which a UAV requests access. As illustrated in FIG. 3, the UAV access method includes the following steps 310-390.

At S310, a random access request sent by a UAV is received, and the random access request includes an RAP. This step is identical with step 110, and will not be described again here.

At S320, when it is determined to respond to the random access request of the UAV, a random access initial response is sent to the UAV. This step is identical with step 120, and will not be described again here.

At S330, a first message sent by the UAV is received, the first message includes terminal indication information, and the terminal indication information is configured to indicate that a terminal, which requests access, is the UAV. This step is identical with step 130, and will not be described again here.

At S340, it is judged whether a degree of interference of a current cell to a neighboring cell is less than a set threshold. If yes, step 350 is executed. Otherwise, step 370 is executed.

At S350, it is determined to allow access of the UAV.

At S360, a second message for indicating that the access is allowed is sent to the UAV, and the flow is ended.

At S370, it is determined that access of the UAV is not allowed.

At S380, a third message for indicating that the access is not allowed is sent to the UAV, and the flow is ended.

It can be seen from the above embodiments that it is judged whether a degree of interference of a current cell to a neighboring cell is less than a set threshold; if yes, it is determined to allow access of the UAV, and a second message for indicating that the access is allowed is sent to the UAV; otherwise, it is determined that the access of the UAV is not allowed, and a third message for indicating that the access is not allowed is sent to the UAV, so that it is determined whether to allow the access of the UAV according to the degree of interference of the current cell to the neighboring cell, thereby avoiding that the current cell can cause great interference to the neighboring cell.

Figure 4:
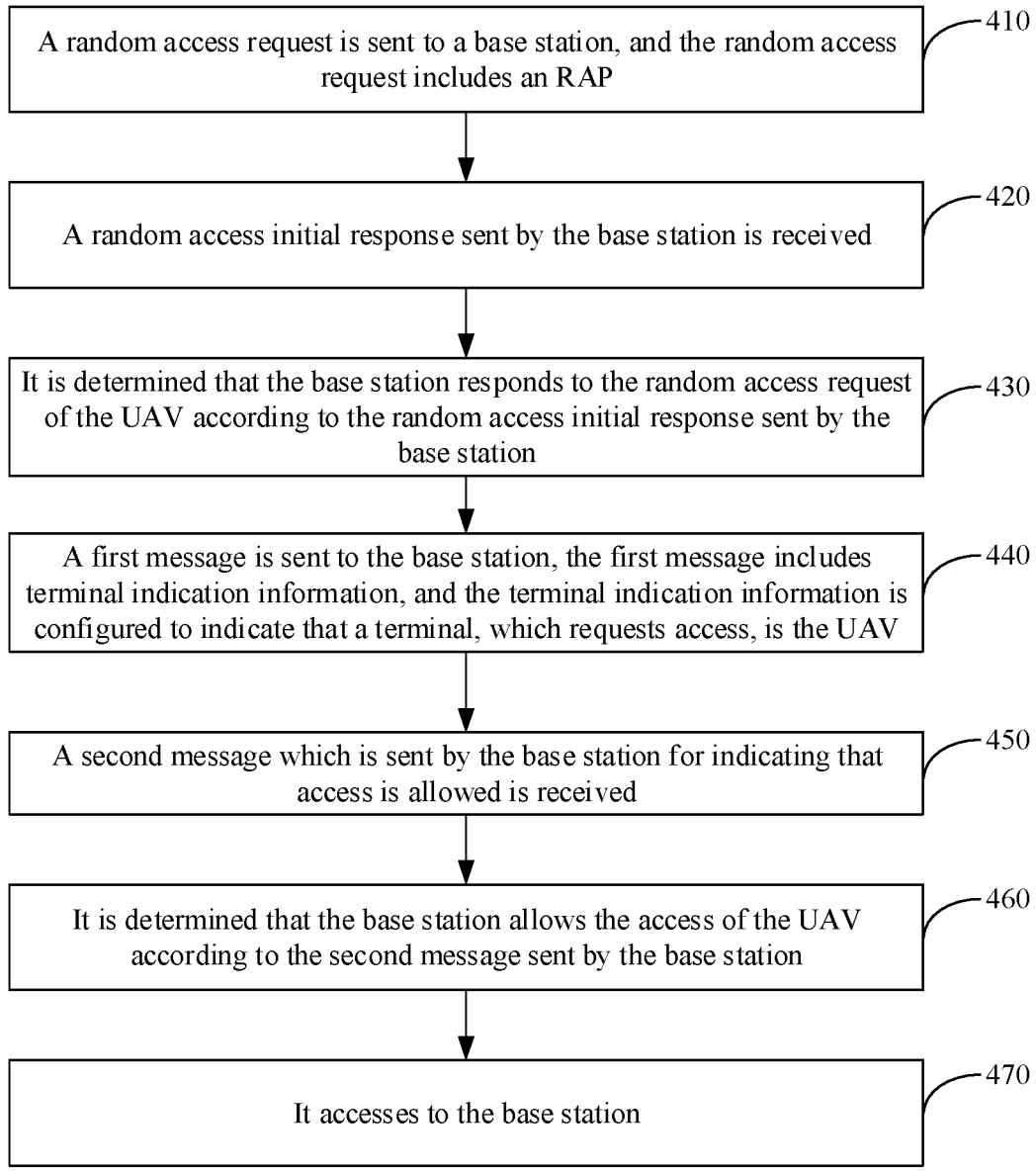
FIG. 4 is a flowchart of a UAV access method according to an exemplary embodiment.

FIG. 4 is a flowchart of a UAV access method according to an exemplary embodiment. The UAV access method can be applied to a UAV, and the UAV is a terminal which requests recess to a base station. As illustrated in FIG. 4, the UAV access method includes the following steps 410-470.

At S410, a random access request is sent to a base station, and the random access request includes an RAP.

In embodiments of the present disclosure, when the UAV requests access to the base station, a preamble can be selected and added to a random access request, and then the random access request is sent to the base station.

In embodiments of the present disclosure, the random access can be a contention-based random access, and the random access request can be an RAP in a contention-based random access process.

At S420, a random access initial response sent by the base station is received.

In embodiments of the present disclosure, the random access initial response can be an RAR in a contention-based random access process.

At S430, it is determined that the base station responds to the random access request of the UAV according to the random access initial response sent by the base station.

At S440, a first message is sent to the base station, the first message includes terminal indication information, and the terminal indication information is configured to indicate that a terminal, which requests access, is the UAV.

In embodiments of the present disclosure, the first message can be message 3 in the contention-based random access process.

At S450, a second message which is sent by the base station for indicating that access is allowed is received.

In embodiments of the present disclosure, the second message can be contention resolution signaling in the contention-based random access process.

At S460, it is determined that the base station allows the access of the UAV according to the second message sent by the base station.

At S470, it accesses to the base station.

It can be seen from the above embodiment that a random access request is sent to a base station, and the random access request includes an RAP. A random access initial response sent by the base station is received, and it is determined that the base station responds to the random access request according to the random access initial response. A first message is sent to the base station, the first message includes terminal indication information, and the terminal indication information is configured to indicate that a terminal, which requests access, is a UAV. A second message which is sent by the base station for indicating that access is allowed is received, and it is determined that the base station allows the access of the UAV according to the second message. It accesses to the base station. Thus, the base station learns that the terminal, which requests access, is the UAV according to the terminal indication information, and determines whether to allow the access of the UAV according to specific situations, so that control of access of a UAV to be started in a random access phase is enabled, thereby avoiding interference possibly generated by the UAV.

In an embodiment, the random access initial response at S420 includes the RAP.

In this manner, when step 430 is executed, it can be determined that the base station responds to the random access request of the UAV according to the random access initial response which is sent by the base station and includes the RAP of the UAV.

It can be seen from the above embodiments that a random access initial response that is sent by the base station and includes the RAP of the UAV is received, so that the UAV can quickly determine that the base station responds to the random access request of the UAV according to the RAP, and the access efficiency and reliability of the UAV are improved.

In an embodiment, the terminal indication information at S440 includes at least one of: a UAV type identifier, a UAV identification number, or a UAV device number.

It can be seen from the above embodiments that the terminal indication information can include at least one of: the UAV type identifier, the UAV identification number, or the UAV device number. The UAV type identifier, the UAV identification number and the UAV device number can be configured to indicate that the terminal, which requests access, is the UAV, so that the indication manner of the UAV is enriched, and the access efficiency of the UAV is improved.

In an embodiment, the second message at S450 includes the terminal indication information.

In this manner, when step 460 is executed, it can be determined that the base station allows the access of the UAV according to the second message including the terminal indication information of the UAV.

It can be seen from the above embodiments that a second message which is sent by the base station for indicating that the access is allowed is received, and the second message includes the terminal indication information, so that the UAV can quickly determine that the base station allows the access of the UAV according to the terminal indication information, and the access efficiency and reliability of the UAV are improved.

In an embodiment, after executing step 440, the UAV access method further includes the following steps.

(1) A third message which is sent by the base station for indicating that access is not allowed is received.

(2) It is determined that the base station does not allow the access of the UAV according to the third message.

In embodiments of the present disclosure, the third message can be contention resolution signaling in the contention-based random access process.

It can be seen from the above embodiments that a third message which is sent by the base station for indicating that the access is not allowed is received, and it is determined that the base station does not allow the access of the UAV according to the third message, so that control of access of a UAV to be started in a random access phase is enabled, thereby avoiding interference possibly generated by the UAV.

Corresponding to the aforementioned UAV access method embodiments, the present disclosure also provides embodiments of a UAV access device.

Figure 5:
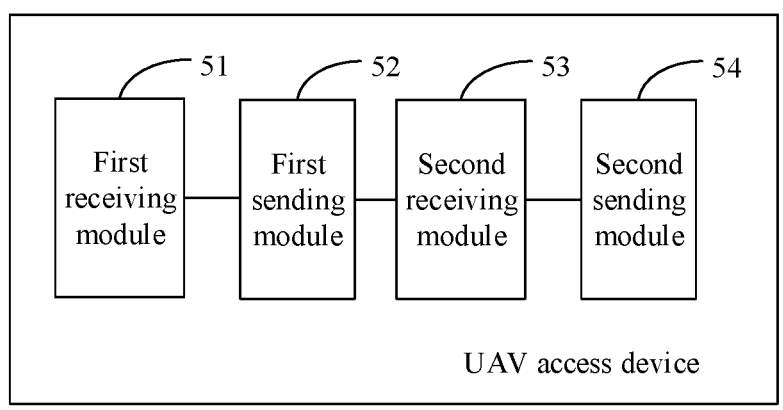
FIG. 5 is a block diagram of a UAV access device according to an exemplary embodiment.

FIG. 5 is a block diagram of a UAV access device according to an exemplary embodiment. The device is applied to a base station, and the base station is a base station to which a UAV requests access. The device is configured to perform the UAV access method illustrated in FIG. 1. As illustrated in FIG. 5, the UAV access device can include: a first receiving module 51, a first sending module 52, a second receiving module 53, and a second sending module 54.

The first receiving module 51 is configured to receive a random access request sent by a UAV, and the random access request includes an RAP.

The first sending module 52 is configured to send, when it is determined to respond to the random access request of the UAV, a random access initial response to the UAV.

The second receiving module 53 is configured to receive a first message sent by the UAV, the first message includes terminal indication information, and the terminal indication information is configured to indicate that a terminal, which requests access, is the UAV.

The second sending module 54 is configured to send, when it is determined to allow access of the UAV, a second message for indicating that the access is allowed to the UAV.

It can be seen from the above embodiment that a random access request sent by a UAV is received, and the random access request includes an RAP. When it is determined to respond to the random access request of the UAV, a random access initial response is sent to the UAV. A first message sent by the UAV is received, the first message includes terminal indication information, and the terminal indication information is configured to indicate that a terminal, which requests access, is the UAV. When it is determined to allow access of the UAV, a second message for indicating that the access is allowed is sent to the UAV, so that control of access of a UAV to be started in a random access phase is enabled, thereby avoiding interference possibly generated by the UAV.

Optionally, the random access initial response includes the RAP.

It can be seen from the above embodiments that a random access initial response including the RAP of the UAV is sent to the UAV, so that the UAV receives the random access initial response consistent with the RAP sent by the UAV, it can be quickly determined that the base station responds to the random access request of the UAV, and the access efficiency and reliability of the UAV are improved.

Optionally, the terminal indication information includes at least one of: a UAV type identifier, a UAV identification number, or a UAV device number.

It can be seen from the above embodiments that the terminal indication information can include at least one of: the UAV type identifier, the UAV identification number, or the UAV device number. The UAV type identifier, the UAV identification number and the UAV device number can be configured to indicate that the terminal, which requests access, is the UAV, so that the indication manner of the UAV is enriched, and the access efficiency of the UAV is improved.

Optionally, the second message includes the terminal indication information.

It can be seen from the above embodiments that a second message for indicating that the access is allowed is sent to the UAV, and the second message includes the terminal indication information, so that the UAV receives the second message consistent with the terminal indication information sent by the UAV, it can be quickly determined that the base station allows the access of the UAV, and the access efficiency and reliability of the UAV are improved.

Figure 6:
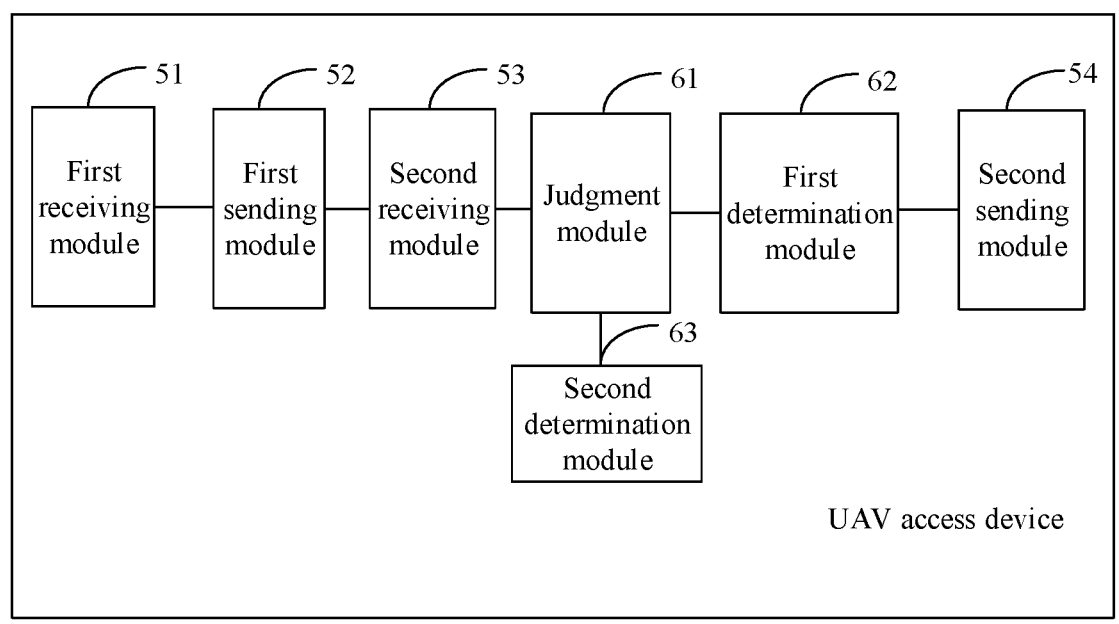
FIG. 6 is a block diagram of another UAV access device according to an exemplary embodiment.

FIG. 6 is a block diagram of another UAV access device according to an exemplary embodiment. The device is applied to a base station, and the base station is a base station to which a UAV requests access. The device is on the basis of the device illustrated in FIG. 5. As illustrated in FIG. 6, the UAV access device can include: a judgment module 61, a first determination module 62 and a second determination module 63.

The judgment module 61 is configured to judge whether a degree of interference of a current cell to a neighboring cell is less than a set threshold.

The first determination module 62 is configured to determine, if the degree of interference is less than the set threshold, to allow access of the UAV.

The second determination module 63 is configured to determine, if the degree of interference is greater than or equal to the set threshold, that the access of the UAV is not allowed.

It can be seen from the above embodiments that it is judged whether a degree of interference of a current cell to a neighboring cell is less than a set threshold; if yes, it is determined to allow access of the UAV; otherwise, it is determined that the access of the UAV is not allowed, so that it is determined whether to allow the access of the UAV according to the degree of interference of the current cell to the neighboring cell, thereby avoiding that the current cell can cause great interference to the neighboring cell.

Figure 7:
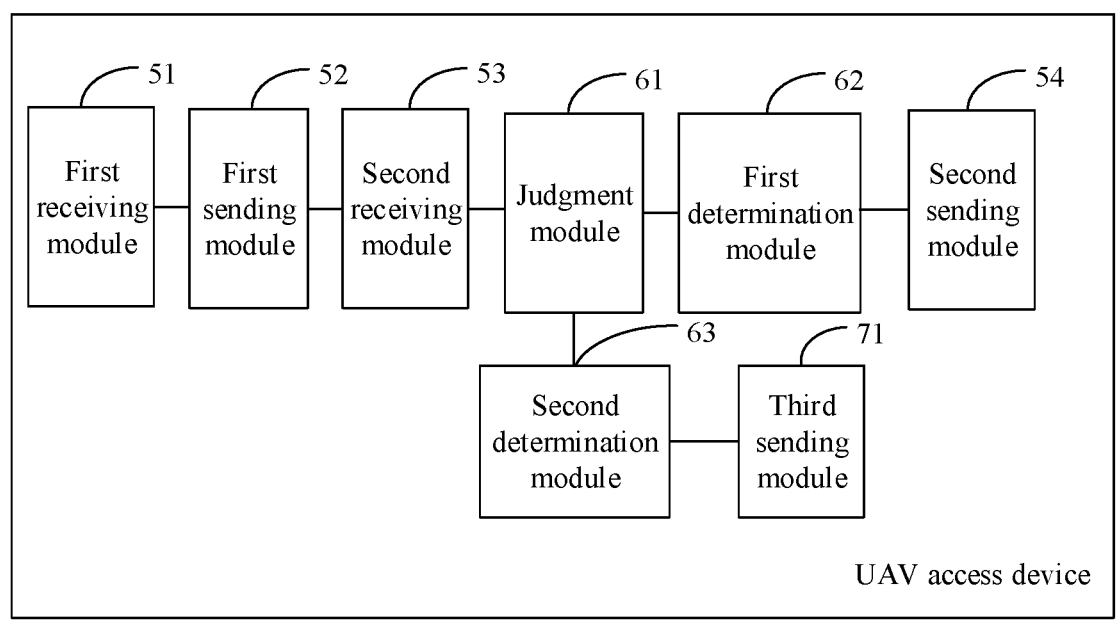
FIG. 7 is a block diagram of another UAV access device according to an exemplary embodiment.

FIG. 7 is a block diagram of another UAV access device according to an exemplary embodiment. The device is applied to a base station, and the base station is a base station to which a UAV requests access. The device is on the basis of the device illustrated in FIG. 5 or FIG. 6. As illustrated in FIG. 7, the UAV access device can include: a third sending module 71.

The third sending module 71 is configured to send, when it is determined that the access of the UAV is not allowed, a third message for indicating that the access is not allowed to the UAV.

It can be seen from the above embodiments that a third message for indicating that the access is not allowed to the UAV when it is determined that the access of the UAV is not allowed, so that control of access of a UAV to be started in a random access phase is enabled, thereby avoiding interference possibly generated by the UAV.

Figure 8:
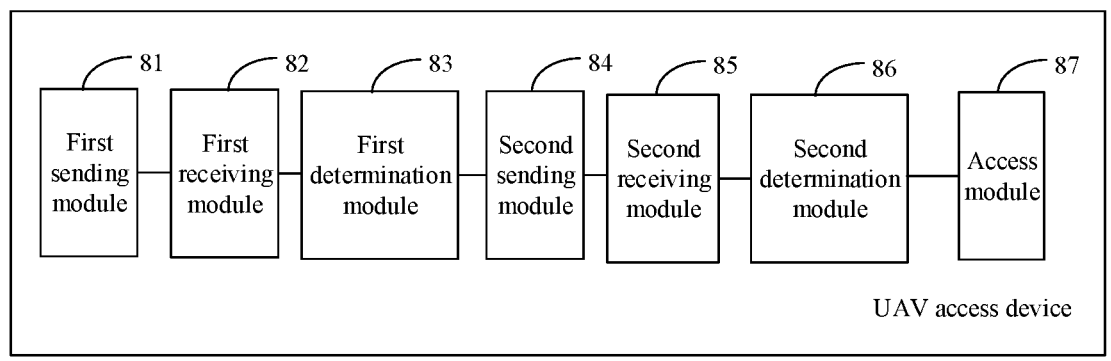
FIG. 8 is a block diagram of a UAV access device according to an exemplary embodiment.

FIG. 8 is a block diagram of a UAV access device according to an exemplary embodiment. The device is applied to a UAV, and the UAV is a terminal which requests access to a base station. The device is configured to perform the UAV access method illustrated in FIG. 4. As illustrated in FIG. 8, the UAV access device can include: a first sending module 81, a first receiving module 82, a first determination module 83, a second sending module 84, a second receiving module 85, a second determination module 86, and an access module 87.

The first sending module 81 is configured to send a random access request to a base station, and the random access request includes an RAP.

The first receiving module 82 is configured to receive a random access initial response sent by the base station.

The first determination module 83 is configured to determine that the base station responds to the random access request according to the random access initial response.

The second sending module 84 is configured to send a first message to the base station, the first message includes terminal indication information, and the terminal indication information is configured to indicate that a terminal, which requests access, is the UAV.

The second receiving module 85 is configured to receive a second message which is sent by the base station for indicating that access is allowed.

The second determination module 86 is configured to determine that the base station allows the access of the UAV according to the second message.

The access module 87 is configured to access to the base station.

It can be seen from the above embodiment that a random access request is sent to a base station, and the random access request includes an RAP. A random access initial response sent by the base station is received, and it is determined that the base station responds to the random access request according to the random access initial response. A first message is sent to the base station, the first message includes terminal indication information, and the terminal indication information is configured to indicate that a terminal, which requests access, is a UAV. A second message which is sent by the base station for indicating that access is allowed is received, and it is determined that the base station allows the access of the UAV according to the second message. It accesses to the base station. Thus, the base station learns that the terminal, which requests access, is the UAV according to the terminal indication information, and determines whether to allow the access of the UAV according to specific situations, so that control of access of a UAV to be started in a random access phase is enabled, thereby avoiding interference possibly generated by the UAV.

Figure 9:
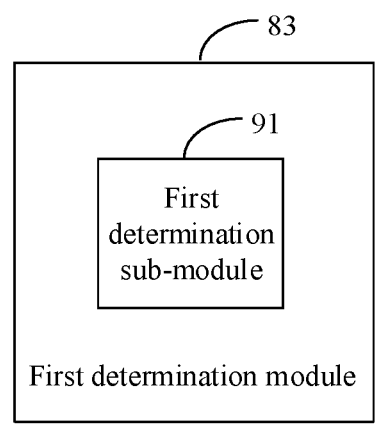
FIG. 9 is a block diagram of another UAV access device according to an exemplary embodiment.

FIG. 9 is a block diagram of another UAV access device according to an exemplary embodiment. The device is applied to a UAV, and the UAV is a terminal which requests access. The device is on the basis of the device illustrated in FIG. 8. The random access initial response includes the RAP. As illustrated in FIG. 9, the first determination module 83 can include: a first determination sub-module 91.

The first determination sub-module 91 is configured to determine that the base station responds to the random access request according to the random access initial response including the RAP.

It can be seen from the above embodiments that a random access initial response that is sent by the base station and includes the RAP of the UAV is received, so that the UAV can quickly determine that the base station responds to the random access request of the UAV according to the RAP, and the access efficiency and reliability of the UAV are improved.

Optionally, the terminal indication information includes at least one of: a UAV type identifier, a UAV identification number, or a UAV device number.

It can be seen from the above embodiments that the terminal indication information can include at least one of: the UAV type identifier, the UAV identification number, or the UAV device number. The UAV type identifier, the UAV identification number and the UAV device number can be configured to indicate that the terminal, which requests access, is the UAV, so that the indication manner of the UAV is enriched, and the access efficiency of the UAV is improved.

Figure 10:
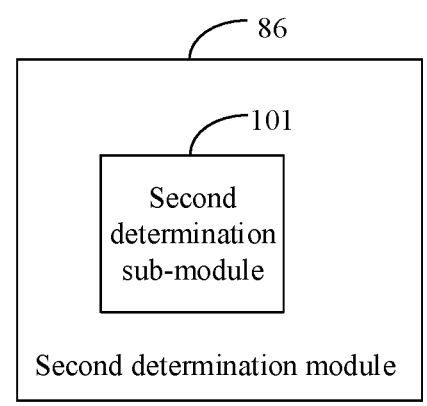
FIG. 10 is a block diagram of another UAV access device according to an exemplary embodiment.

FIG. 10 is a block diagram of another UAV access device according to an exemplary embodiment. The device is applied to a UAV, and the UAV is a terminal which requests access. The device is on the basis of the device illustrated in FIG. 8. The second message includes the terminal indication information. As illustrated in FIG. 10, the second determination module 86 can include: a second determination sub-module 101.

The second determination sub-module 101 is configured to determine that the base station allows the access of the UAV according to the second message including the terminal indication information.

It can be seen from the above embodiments that a second message which is sent by the base station for indicating that the access is allowed is received, and the second message includes the terminal indication information, so that the UAV can quickly determine that the base station allows the access of the UAV according to the terminal indication information, and the access efficiency and reliability of the UAV are improved.

Figure 11:
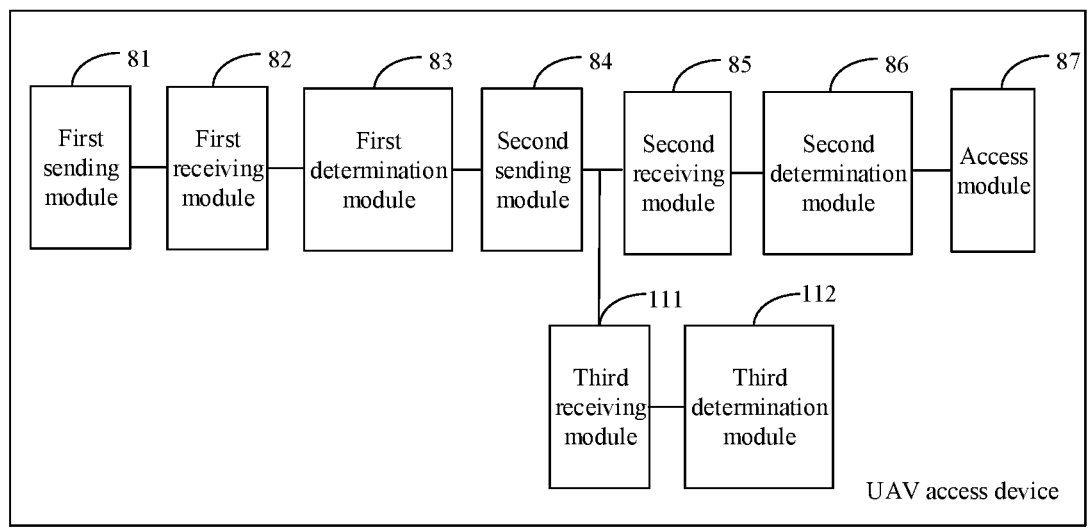
FIG. 11 is a block diagram of another UAV access device according to an exemplary embodiment.

FIG. 11 is a block diagram of another UAV access device according to an exemplary embodiment. The device is applied to a UAV, and the UAV is a terminal which requests access. The device is on the basis of the device illustrated in FIG. 8. As illustrated in FIG. 11, the device can further include: a third receiving module 111 and a third determination module 112.

The third receiving module 111 is configured to receive a third message which is sent by the base station for indicating that the access is not allowed.

The third determination module 112 is configured to determine that the base station does not allow the access of the UAV according to the third message.

It can be seen from the above embodiments that a third message which is sent by the base station for indicating that the access is not allowed is received, and it is determined that the base station does not allow the access of the UAV according to the third message, so that control of access of a UAV to be started in a random access phase is enabled, thereby avoiding interference possibly generated by the UAV.

The apparatus embodiments substantially correspond to the method embodiments, and thus related parts refer to part of descriptions of the method embodiments. The device embodiments described above are only schematic, units described as separate parts therein can or cannot be physically separated, and parts displayed as units can or cannot be physical units, and namely can be located in the same place or can also be distributed to multiple network units. Part or all of the modules therein can be selected according to a practical requirement to achieve the purpose of the solutions of the present disclosure. Those of ordinary skill in the art can understand and implement without creative work.

Correspondingly, the present disclosure also provides a computer-readable storage medium having a computer program stored thereon. The computer program is configured to execute the UAV access method illustrated in FIG. 1 or FIG. 3.

Correspondingly, the present disclosure also provides a computer-readable storage medium having a computer program stored thereon. The computer program is configured to execute the UAV access method illustrated in FIG. 4.

Correspondingly, the present disclosure also provides a UAV access device. The device is applied to a base station, and includes:
a processor; and
a memory configured to store an instruction executable for the processor,
where the processor is configured to:
receive a random access request sent by a UAV, and the random access request includes an RAP;
send a random access initial response to the UAV when it is determined to respond to the random access request of the UAV;
receive a first message sent by the UAV, the first message includes terminal indication information, and the terminal indication information is configured to indicate that a terminal, which requests access, is the UAV; and
send a second message for indicating that access is allowed to the UAV when it is determined to allow the access of the UAV.

Figure 12:
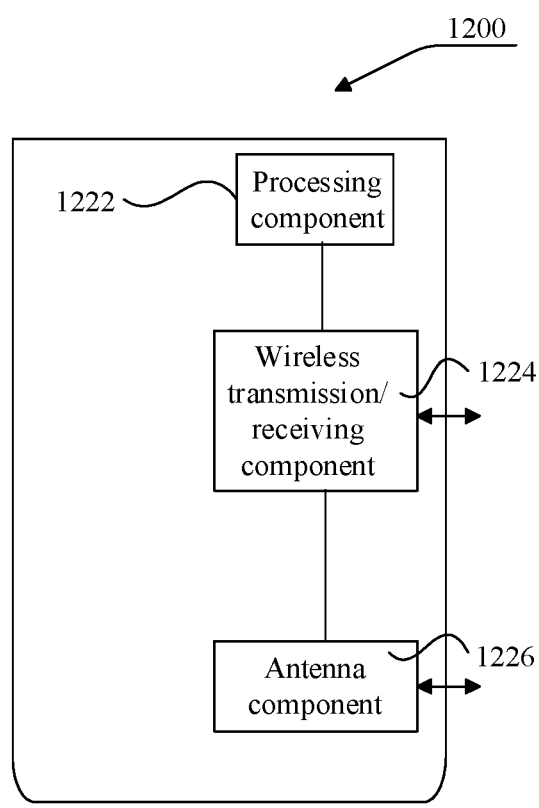
FIG. 12 is a structural schematic diagram of a UAV access device according to an exemplary embodiment.

As illustrated in FIG. 12, FIG. 12 is a structural schematic diagram of a UAV access device according to an exemplary embodiment. The device 1200 can be provided as a base station. Referring to FIG. 12, the device 1200 includes a processing component 1222, a wireless transmission/receiving component 1224, an antenna component 1226 and a wireless interface-specific signal processing part. The processing component 1222 can further include one or more processors.

One processor in the processing component 1222 can be configured to perform the UAV access method as described above.

Correspondingly, the present disclosure also provides a UAV access device. The device is applied to a UAV, and includes:
a processor; and
a memory configured to store an instruction executable for the processor.
The processor is configured to:
send a random access request to a base station, and the random access request includes an RAP;
receive a random access initial response sent by the base station;

determine that the base station responds to the random access request according to the random access initial response;

send a first message to the base station, the first message includes terminal indication information, and the terminal indication information is configured to indicate that a terminal, which requests access, is the UAV;

receive a second message which is sent by the base station for indicating that access is allowed;

determine that the base station allows the access of the UAV according to the second message; and access to the base station.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. An Unmanned Aerial Vehicle (UAV) access method, applied to a base station, comprising:
receiving a random access request sent by a UAV, wherein the random access request comprises a Random Access Preamble (RAP);
sending a random access initial response to the UAV when it is determined to respond to the random access request of the UAV;
receiving a first message sent by the UAV, wherein the first message comprises terminal indication information and the terminal indication information is configured to indicate that a terminal, which requests access, is the UAV; and
sending a second message for indicating that access is allowed to the UAV when it is determined to allow the access of the UAV.

2. The method of claim 1, wherein the random access initial response comprises the RAP.

3. The method of claim 1, wherein the terminal indication information comprises at least one of: a UAV type identifier, a UAV identification number, or a UAV device number.

4. The method of claim 1, wherein the second message comprises the terminal indication information.

5. The method of claim 1, further comprising:
judging whether a degree of interference of a current cell to a neighboring cell is less than a set threshold;
when the degree of interference is less than the set threshold, determining to allow the access of the UAV; and
when the degree of interference is greater than or equal to the set threshold, determining that the access of the UAV is not allowed.

6. An Unmanned Aerial Vehicle (UAV) access device implementing the UVA access method of claim 1, applied to a base station, comprising:
a processor; and
a memory configured to store an instruction for execution by the processor;
wherein the processor is configured to:
receive a random access request sent by a UAV, wherein the random access request comprises a Random Access Preamble (RAP);
send a random access initial response to the UAV when it is determined to respond to the random access request of the UAV;
receive a first message sent by the UAV, wherein the first message comprises terminal indication information and the terminal indication information is configured to indicate that a terminal, which requests access, is the UAV; and
send a second message for indicating that access is allowed to the UAV when it is determined to allow the access of the UAV.

7. An Unmanned Aerial Vehicle (UAV) access method, applied to a UAV, comprising:
sending a random access request to a base station, wherein the random access request comprises a Random Access Preamble (RAP);
receiving a random access initial response sent by the base station;
determining that the base station responds to the random access request according to the random access initial response;
sending a first message to the base station, wherein the first message comprises terminal indication information and the terminal indication information is configured to indicate that a terminal, which requests access, is the UAV;
receiving a second message which is sent by the base station for indicating that access is allowed;
determining that the base station allows the access of the UAV according to the second message; and
accessing to the base station.

8. The method of claim 7, wherein the random access initial response comprises the RAP, and the determining that the base station responds to the random access request according to the random access initial response comprises:
determining that the base station responds to the random access request according to the random access initial response including the RAP.

9. The method of claim 7, wherein the terminal indication information comprises at least one of: a UAV type identifier, a UAV identification number, or a UAV device number.

10. The method of claim 7, wherein the second message comprises the terminal indication information, and the determining that the base station allows the access of the UAV according to the second message comprises:
determining that the base station allows the access of the UAV according to the second message including the terminal indication information.

11. An Unmanned Aerial Vehicle (UAV) access device, applied to a UAV, comprising:
a processor; and
a memory configured to store an instruction executable for the processor;
wherein the processor is configured to:
send a random access request to a base station, wherein the random access request comprises a Random Access Preamble (RAP);
receive a random access initial response sent by the base station;
determine that the base station responds to the random access request according to the random access initial response;
send a first message to the base station, wherein the first message comprises terminal indication information and the terminal indication information is configured to indicate that a terminal, which requests access, is the UAV;
receive a second message which is sent by the base station for indicating that access is allowed;
determine that the base station allows the access of the UAV according to the second message; and
access to the base station.

12. The device of claim 6, wherein the random access initial response comprises the RAP.

13. The device of claim 6, wherein the terminal indication information comprises at least one of: a UAV type identifier, a UAV identification number, or a UAV device number.

14. The device of claim 6, wherein the second message comprises the terminal indication information.

15. The device of claim 6, wherein the processor is further configured to:
judge whether a degree of interference of a current cell to a neighboring cell is less than a set threshold;
determine to allow the access of the UAV when the degree of interference is less than the set threshold; and
determine that the access of the UAV is not allowed when the degree of interference is greater than or equal to the set threshold.

16. The device of claim 11, wherein the random access initial response comprises the RAP, and the processor is further configured to:
determine that the base station responds to the random access request according to the random access initial response including the RAP.

17. The device of claim 11, wherein the terminal indication information comprises at least one of: a UAV type identifier, a UAV identification number, or a UAV device number.

18. The device of claim 11, wherein the second message comprises the terminal indication information, and the processor is further configured to:
determine that the base station allows the access of the UAV according to the second message including the terminal indication information.

19. A communication system implementing the method according to claim 1, comprising the base station, wherein
the base station is configured to send a random access initial response including the RAP of the UAV to the UAV, such that the UAV receives the random access initial response consistent with the RAP sent by the UAV, thereby determining that the base station responds to the random access request of the UAV, and improving access efficiency and reliability of the UAV;
terminal indication information received by the base station includes at least one of: a UAV type identifier, a UAV identification number, or a UAV device number, configured to indicate that the terminal, which requests access, is the UAV;
the base station is further configured to send a second message for indicating that the access is allowed to the UAV, and the second message includes the terminal indication information, such that the UAV receives the second message consistent with the terminal indication information sent by the UAV;
the base station is further configured to determine whether a degree of interference of a current cell to a neighboring cell is less than a set threshold, to thereby determine allowing or not allowing the access of the UAV, respectively, thereby avoiding the current cell causing interference to the neighboring cell; and
upon it is determined that the access of the UAV is not allowed, the base station is configured to send a third message for indicating that the access is not allowed to the UAV, such that control of access of a UAV to be started in a random access phase is enabled, thereby avoiding interference generated by the UAV.

20. The communication system of claim 19, further comprising the UAV, wherein
the UAV is configured to send a random access request to the base station, and the random access request includes an RAP;
the UAV is further configured to receive a random access initial response sent by the base station, determine that the base station responds to the random access request according to the random access initial response, and send a first message to the base station;
the first message includes terminal indication information, and the terminal indication information is configured to indicate that a terminal, which requests access, is the UAV;
the UAV is further configured to receive a second message which is sent by the base station for indicating that access is allowed, determine that the base station allows the access of the UAV according to the second message, and access the base station; and
the UAV is further configured to receive a random access initial response which is sent by the base station and includes the RAP of the UAV, such that the UAV determines that the base station responds to the random access request of the UAV according to the RAP, thereby improving access efficiency and reliability of the UAV.

* * * * *